(12) United States Patent
Peters et al.

(10) Patent No.: US 11,493,317 B2
(45) Date of Patent: Nov. 8, 2022

(54) WHEEL HOLDER

(71) Applicant: Beissbarth GmbH, Munich (DE)

(72) Inventors: Stefanie Peters, Darmstadt (DE);
Trendafil Ilchev, Munich (DE);
Christian Wagmann, Munich (DE);
Claudia Hofmann, Munich (DE)

(73) Assignee: Beissbarth GmbH, Munich (DE)

( * ) Notice: Subject to any disclaimer, the term of this patent is extended or adjusted under 35 U.S.C. 154(b) by 0 days.

(21) Appl. No.: 17/273,788

(22) PCT Filed: Aug. 22, 2019

(86) PCT No.: PCT/EP2019/072439
§ 371 (c)(1),
(2) Date: Mar. 5, 2021

(87) PCT Pub. No.: WO2020/048781
PCT Pub. Date: Mar. 12, 2020

(65) Prior Publication Data
US 2021/0325165 A1    Oct. 21, 2021

(30) Foreign Application Priority Data
Sep. 6, 2018 (DE) ............... 10 2018 215 165.2

(51) Int. Cl.
*G01B 5/255* (2006.01)
*G01B 5/00* (2006.01)
*G01B 7/315* (2006.01)
*G01B 11/275* (2006.01)

(52) U.S. Cl.
CPC ........... *G01B 5/255* (2013.01); *G01B 5/0004* (2013.01); *G01B 7/315* (2013.01); *G01B 11/275* (2013.01)

(58) Field of Classification Search
CPC ...................................................... G01B 5/255
USPC ....................................................... 33/203.18
See application file for complete search history.

(56) References Cited

U.S. PATENT DOCUMENTS

| | | | | |
|---|---|---|---|---|
| 3,709,451 A | * | 1/1973 | Graham | G01B 11/275 33/203.18 |
| 4,285,136 A | * | 8/1981 | Ragan | G01B 5/255 33/336 |
| 4,377,038 A | * | 3/1983 | Ragan | G01B 21/26 33/336 |
| 6,131,293 A | * | 10/2000 | Maioli | G01B 5/255 33/203.18 |
| 6,718,646 B2 | * | 4/2004 | Corghi | G01B 5/255 33/203.18 |

(Continued)

*Primary Examiner* — George B Bennett
(74) *Attorney, Agent, or Firm* — Wiggin and Dana LLP (57) ABSTRACT

A wheel clamp (2) for fastening to a wheel (1), in particular to a wheel (1) of a motor vehicle, comprises at least two arms (22, 23, 24) which extend outward from a center (28) of the wheel clamp (2) in a radial direction. Each of the arms (22, 23, 24) has at least one movable element (32, 33, 34) which is movable in the radial direction. The wheel clamp (2) comprises a locking member (82) which is designed such that the movable elements (32, 33, 34), by operation of the locking member (82), can be fixed such that the movable elements (32, 33, 34) are no longer movable in the radial direction. The wheel clamp (2) also comprises an unlocking member (84) which is designed such that a fixation of the movable elements (32, 33, 34) can be released by operation of the unlocking member (84).

16 Claims, 4 Drawing Sheets

(56) References Cited

U.S. PATENT DOCUMENTS

| | | | | |
|---|---|---|---|---|
| 7,093,369 B2* | 8/2006 | Ohnesorge | ............... | B60B 7/18 |
| | | | | 33/336 |
| 9,228,819 B2* | 1/2016 | Pruitt | ..................... | G01B 5/255 |
| 9,513,085 B2* | 12/2016 | Hahn | ..................... | F41G 1/033 |
| 11,009,335 B2* | 5/2021 | Kambhaluru | .......... | G01B 5/255 |

* cited by examiner

WHEEL HOLDER

The invention relates to a wheel holder or wheel clamp, in particular a wheel clamp for vehicle wheel alignment measurements, which can be attached to a wheel of a vehicle, in particular a motor vehicle.

PRIOR ART

For vehicle wheel alignment measurements, there are often mounted wheel clamps, which are adapted to support sensors and/or measurement marks ("targets"), on the wheels of the vehicle to be measured for wheel alignment. The handling of such wheel clamps, in particular the attaching and detaching thereof to and from the wheels of the vehicle, is complex and difficult.

As an example for wheel clamps that rest on the tire of the wheel, the following steps are necessary:
transporting the clamp from the storage location to the wheel;
adjusting the clamp to the approximate wheel diameter so that the diameter of the wheel clamp is larger than the wheel diameter and smaller than the diameter of the wheel housing;
applying, correct positioning and manual fixing of the wheel clamp on the wheel so that it does not fall off; and
tensioning the clamping arms of the wheel clamp so that the wheel clamp is securely attached to the wheel during the measurement.

The following factors reduce the convenience and speed of installation:
there is no special holding or carrying handle provided;
attachment is possible with two hands only, since
1. the wheel clamp must always be held on the wheel with at least one hand, as otherwise it will fall off, and the other hand will be required for tensioning and fixing, or
2. one-handed operation is possible, but the hand position must be changed for tensioning, or
3. both hands are required for the correct positioning and clamping of the arms, with one hand being required in addition to operate a locking lever.

In addition, there is always the risk that the measurement results of the wheel alignment are falsified by incorrect and/or inaccurate attachment of the wheel clamps.

It is an object of the invention to simplify attaching and detaching of a wheel clamp to and from the wheels of a vehicle and to reduce the risk of incorrect and/or inaccurate attachment.

DISCLOSURE OF THE INVENTION

According to one embodiment of the invention, a wheel clamp provided for fastening to a wheel, in particular to a wheel of a motor vehicle, comprises at least two arms which extend outward from a center of the wheel clamp in a radial direction. Each arm has at least one movable element which is movable in the radial direction so that the length of the arm in the radial direction can be varied. The wheel clamp comprises furthermore a locking member which is designed such that the movable elements can be fixed by operation of the locking member in such a way that they are no longer movable in the radial direction and are additionally clamped against the wheel; and an unlocking member which is designed such that a fixation of the movable elements can be released by operation of the unlocking member.

The locking member and the unlocking member in particular are formed separately from one another, i.e. as two members that are separate from one another.

In one embodiment, the wheel clamp comprises at least one carrying handle which is provided for carrying the wheel clamp. In one embodiment, at least one of the locking member and the unlocking member is formed in or on the carrying handle. A locking mechanism, which clamps the clamp securely to the wheel, is operated by means of the locking and unlocking members.

The locking member and the unlocking member in particular are provided in the immediate vicinity of the operating location, so that no changing of the hand position is necessary.

Handling of the wheel clamp can thus be significantly simplified.

A wheel clamp designed according in accordance with an embodiment of the invention enables genuine one-hand operation.

The carrying handle with the locking member and the unlocking member is designed in particular such that the handling and attachment of the clamp to a wheel is possible both with the right and left hand. The wheel clamp is therefore equally suitable for right- and left-handers.

In one embodiment it is possible to preliminarily adjust the wheel clamp to the approximate diameter of the wheel, so that the diameter of the wheel clamp is slightly larger than the diameter of the wheel while the wheel adapter can still be inserted into the wheel arch. The movable elements of the wheel clamp are coupled such that they move synchronously with one another. I.e., the diameter of the wheel clamp is changed symmetrically to the center of the wheel clamp by moving one of the movable elements.

A wheel clamp according to an embodiment of the invention can be easily and securely attached to a wheel by operation of the locking member, and can be easily and quickly released from the wheel by operation of the unlocking member. The locking member and the unlocking member can each be operated easily with only one single hand. A second hand is not required with a wheel clamp according to the invention for achieving high accuracy in aligning the clamp on the wheel.

In one embodiment, the wheel clamp comprises a locking device having at least one movable locking mechanism that is coupled with the locking member such that the locking mechanism, by operation of the locking member, can be moved into a locking position in which it additionally clamps the movable elements against the wheel and fixes the same in this position so that the movable elements are no longer movable in the radial direction. In this way, the movable elements can be clamped against the wheel in particularly simple and reliable manner and fixed in this position.

In one embodiment, the locking mechanism can be pivoted into the locking position. A pivotably supported locking mechanism can be moved into the locking position by a locking member in particularly easy manner.

In one embodiment, the wheel clamp has a toothed element that is mechanically coupled to the movable elements, and the locking mechanism has a toothed portion which engages with the toothed element when the locking mechanism is in the locking position. In this way, the movable elements can be fixed particularly reliably by moving the locking mechanism into the locking position.

In one embodiment, at least one of the toothed element and the locking mechanism has an arcuate or circular shape. In this way, the toothed element and the toothed portion of the locking mechanism can be efficiently brought into engagement with each other by pivoting the locking mechanism.

In an alternative embodiment, the locking mechanism is formed without toothed portion. In this case, instead of the toothed element, there is provided a non-toothed fixing element which for example can be clamped or jammed with that of the locking mechanism in order to fix the movable elements.

The locking mechanism may comprise in particular an eccentric element that can be moved against a round fixing element and can be jammed with the fixing element.

In one embodiment, the locking mechanism is at least partially elastic. The locking mechanism is designed in particular such that the toothed portion of the locking mechanism can (slightly) yield. In the case of an at least partially elastic locking mechanism, the toothed portion of the locking mechanism can (slightly) yield when the toothed portions of the locking mechanism and of the toothed element are arranged in an unfavorable position to each other, in which there is a risk that the locking mechanism and the toothed element mutually block each other. In particular, a tooth of the elastic toothed portion, which could lead to blockage in a non-elastic locking mechanism, can slip into an adjacent tooth gap of the opposite toothed portion. In this way, undesired blocking of the toothed portions, which would impair the functionality of the locking device, can be avoided.

In one embodiment, the locking mechanism is mechanically coupled to the locking member by a wire cable (Bowden cable). A wire cable provides a reliable, inexpensive and easy-to-operate mechanical coupling between the locking mechanism and the locking member.

In an alternative embodiment, the locking mechanism is hydraulically coupled to the locking member. By means of a hydraulic coupling, a non-linear connection between the locking mechanism and the locking member can be implemented in simple manner.

In one embodiment, the wheel clamp comprises a locking member fixing mechanism which is designed to fix the locking member in a locked position. In this manner, the fixation of the movable elements can be maintained when the operator's hand is removed from the locking member.

In one embodiment, the wheel clamp comprises an elastic element (spring element) which is designed to move the locking member and the locking mechanism into an initial position in which the movable elements are not fixed. Such a spring element can further simplify the handling of the wheel clamp, since the locking member does not have to be moved manually into its initial position.

In the following, an embodiment of a wheel clamp according to the invention will be described in more detail with reference to the accompanying drawings.

DESCRIPTION OF THE FIGURES

Figure 1:
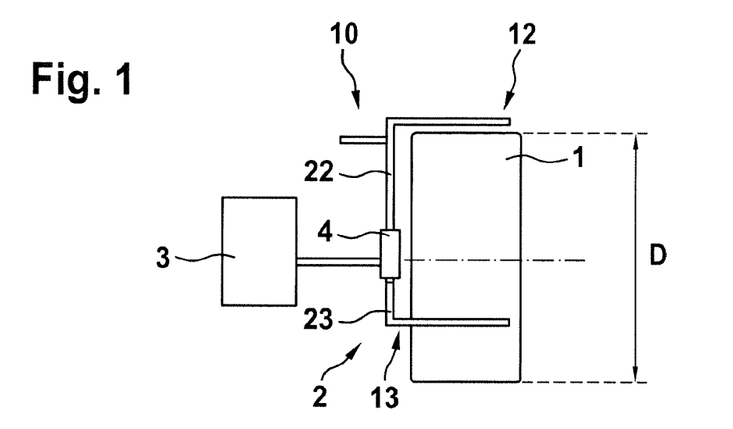
FIG. 1 shows a schematic representation of a wheel with a wheel clamp attached to the wheel.

FIG. 1 shows a schematic representation of a wheel 1 together with a wheel clamp 2 which is mounted on the wheel 1 and has a target 3 attached thereto.

Figure 2:
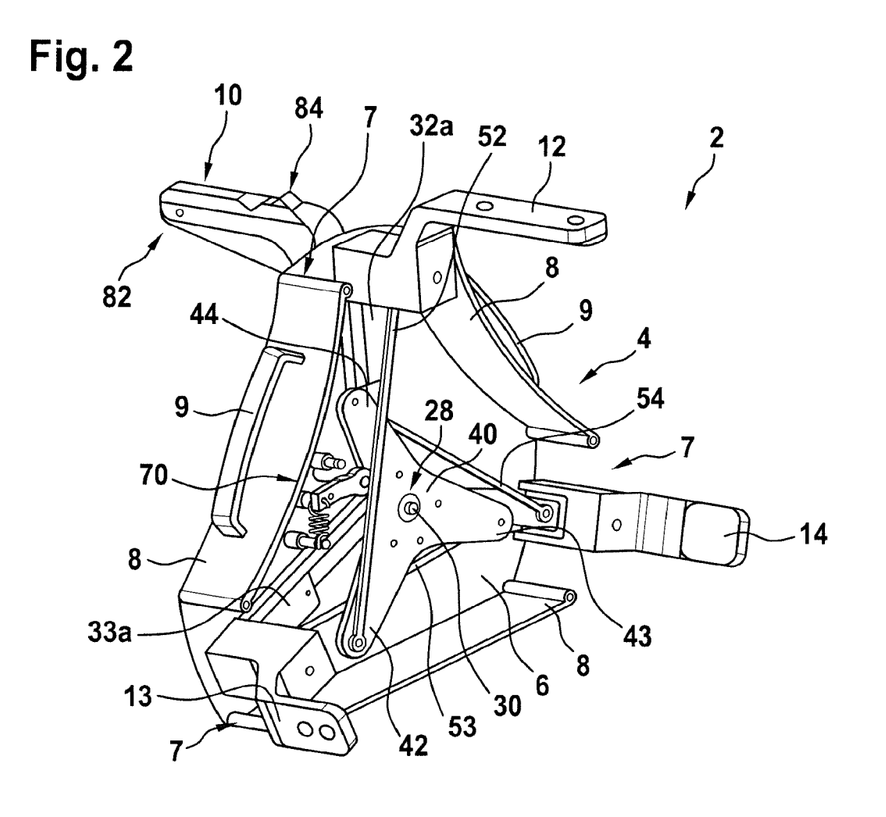
FIGS. 2 and 3 each show a perspective view of a wheel clamp according to an embodiment of the invention.
Figure 3:
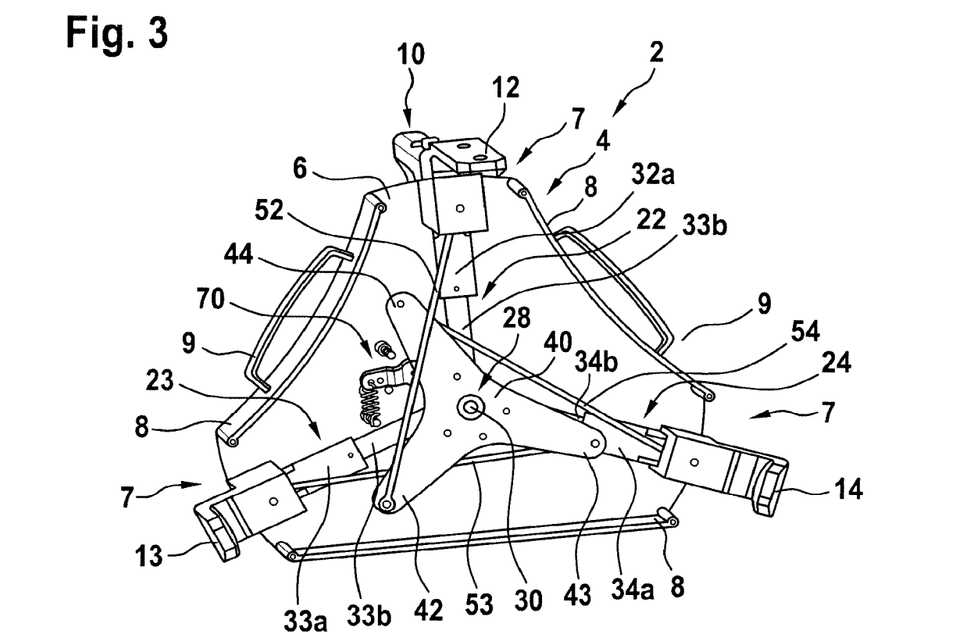

FIGS. 2 and 3 each show a perspective view of a wheel holder or wheel clamp 2 according to an exemplary embodiment of the invention.

The wheel clamp 2 comprises a housing 4 having a base plate 6 and three side walls 8 which extend orthogonally from the edges of the base plate 6 in the same direction. The wheel clamp 2 has several carrying handles 9, 10 facilitating handling of the wheel clamp 2.

A central axis 30 extends orthogonally to the base plate 6 through a central portion (center) 28 of the base plate 6. Three arms 22, 23, 24 extend radially outward from the center 28 of the base plate 6 through openings 7 formed between the side walls 8. The arms 22, 23, 24 extend substantially parallel to the plane of the base plate 6.

The arms 22, 23, 24 each comprise a stationary inner element 32b, 33b, 34b close to the center and a movable outer element 32a, 33a, 34a which is displaceable in the radial direction along the respective inner element 32b, 33b, 34b. The length of the arms 22, 23, 24 in the radial direction can thus be varied by moving, in particular sliding, the outer elements 32a, 33a, 34a along the inner elements 32b, 33b, 34b.

At the outer ends of the outer elements 32a, 33a, 34a facing away from the central axis 30, claws 12, 13, 14 are formed which extend substantially at right angles to the arms 22, 23, 24. The claws 12, 13, 14 are designed to rest on the tread surface of a wheel 1, not shown in FIGS. 2 and 3, when the wheel clamp 2 is attached to a wheel 1 (see FIG. 1).

By moving the outer elements 32a, 33a, 34a outward in the radial direction, the length of the arms 22, 23, 24 can be extended so that the wheel clamp 2 can be easily attached to the wheel 1 in the axial direction of the wheel 1. By moving the outer elements 32a, 33a, 34a inwardly, the arm lengths can be shortened in order to fix the wheel clamp 2 to the wheel 1, as shown in FIG. 1.

A wheel clamp 2 according to an exemplary embodiment of the invention comprises furthermore a central rotary element 40 which is attached on the central axis 30 in the center 28 of the base plate 6 such that it can be rotated about the central axis 30. The rotary element 40 extends in a plane which is oriented substantially parallel to the plane of the base plate 6.

Each of the movable elements 32a, 33a, 34a is connected to the rotary element 40 by a respective coupling element 52, 53, 54. The coupling elements 52, 53, 54 are each movably connected to the rotary element 40 and the movable elements 32a, 33a, 34a so that the coupling elements 52, 53, 54, with respect to the rotary element 40 and the movable elements 32a, 33a, 34a, are pivotable in a plane extending parallel to the plane of the base plate 6.

The coupling elements 52, 53, 54 transform a rotational movement of the rotary element 40 about the central axis 30 into translational movements of the movable elements 32a, 33a, 34a in the radial direction. The movable elements 32a, 33a, 34a can thus be moved in the radial direction along the inner elements 32b, 33b, 34b by rotating the rotary element 40 about the central axis 30 in order to thus vary the length of the arms 22, 23, 24.

By way of the rotary element 40 and the coupling elements 52, 53, 54, the movable elements 32a, 33a, 34a of the arms 22, 23, 24 are coupled to one another such that all movable elements 32a, 33a, 34a move synchronously with one another when one of the movable elements 32a, 33a, 34a is moved. The diameter of the wheel clamp 2 defined by the distance between the claws 12, 13, 14 can therefore be preset in simple manner by moving one of the movable elements 32a, 33a, 34a so that the wheel clamp 2 can be easily, in particular with just one hand, applied to a wheel 1.

In the exemplary embodiment shown in FIGS. 2 and 3, the coupling elements 52, 53, 54 are designed as coupling rods. The coupling elements 52, 53, 54 may also have a different shape, as long as they fulfill the previously described function of transforming a rotational movement of the rotary element 40 into translational movements of the movable elements 32a, 33a, 34a.

In the exemplary embodiment shown in FIGS. 2 and 3, the rotary element 40 is formed with three rotary element arms (projections) which extend radially outward from a central portion of the rotary element 40 on the central axis 30. The coupling elements 52, 53, 54 are each pivotably connected to one of the outer portions of the rotary element arms. With such a configuration of the rotary element 40, it is possible, with little material usage, to implement a mechanical translation which increases the distance over which the movable elements 32a, 33a, 34a move in the radial direction when the rotary element 40 is rotated about the central axis 30 by a predetermined angle.

However, the rotary element arms/projections of the rotary element 40 shown in the figures are not a necessary feature of the invention. The rotary element 40 may also be in the form e.g. of a round, in particular a circular or elliptical, disk or an angular, e.g. triangular or square, disc.

The rotary element 40 is biased by a rotationally elastic element 60 (see FIG. 4) in such a way that the movable elements 32a, 33a, 34a are pulled "inward" by the coupling elements 52, 53, 54, i.e. in the direction toward the central axis 30. The rotationally elastic element 60 is not visible in FIGS. 2 and 3 as it is arranged between the base plate 6 and the rotary element 40 and is concealed by the rotary element 40.

Figure 4:
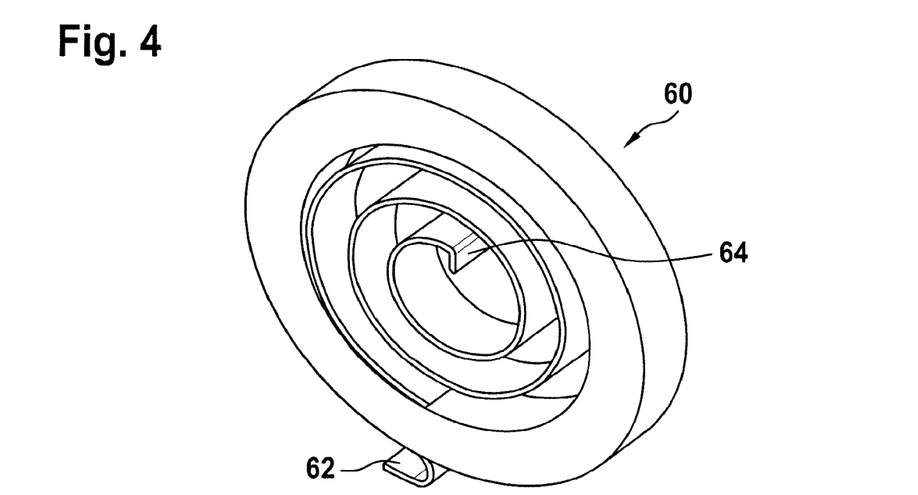
FIG. 4 shows an embodiment of a rotationally elastic element in a perspective schematic representation.

FIG. 4 shows an exemplary embodiment of a rotationally elastic element 60 in a perspective schematic representation.

Figure 5:
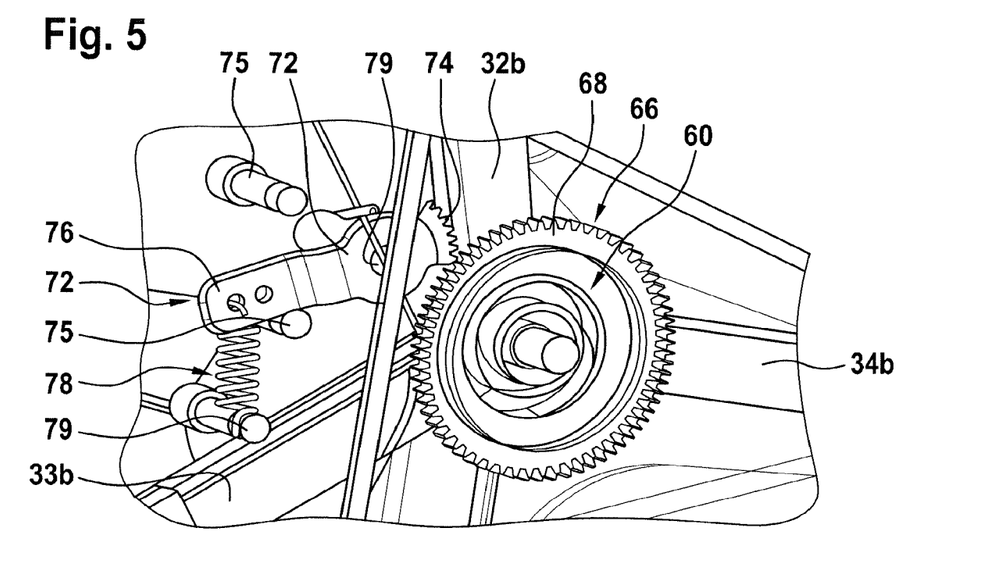
FIG. 5 shows the rotationally elastic element in the installed state.

FIG. 5 shows the rotationally elastic element 60 in the installed state. The rotary element 40 is not shown in FIG. 5 to permit a clear view of the rotationally elastic element 60.

In the exemplary embodiment shown in FIGS. 4 and 5, the rotationally elastic element 60 is in the form of a spiral spring 60 which, starting from the axis 30, extends in a spiral shape outward.

Bent ends 62, 64 of the spiral spring 60 are connected to the rotary element 40 and to the axis 30 or base plate 6, respectively, so that the rotary element 40 tensions and relaxes the spiral spring 60 when it is rotated about the axis 30.

The rotationally elastic element 60 is designed and mounted such that it drives the rotary element 40 in such a way that the movable elements 32a, 33a, 34a are pulled in the direction toward the center 28 by the rotationally elastic element 60. As a result, the length of the arms 22, 23, 24 is minimized, and the wheel clamp 2 is fixed to the wheel 1 by the elastic tensioning force of the rotationally elastic element 60, which is transferred to the claws 12, 13, 14 via the rotary element 40, the coupling elements 52, 53, 54 and the movable elements 32a, 33a, 34a.

The movable elements 32a, 33a, 34a can be moved outward against the force of the rotationally elastic element 60 by muscle power in order to extend the arms 22, 23, 24 so that the wheel clamp 2 can be conveniently attached to the wheel 1 or removed from the same. Due to the elastic force generated by the rotationally elastic element 60, the wheel clamp 2 automatically adapts to different sizes (diameters D) of the wheel 1 in the radial direction within the scope of movement (the maximum path length) of the outer elements 32a, 33a, 34a. A wheel clamp 2 according to the invention thus can be easily attached to wheels 1 of different sizes.

The outer circumference of an annular toothed element 68 surrounding the rotationally elastic element 60 has external teeth 66 formed thereon. The toothed element 68 is non-rotatably connected to the rotary element 40, so that the toothed element 68 and the rotary element 40 can only rotate together about the central axis 30.

Figure 6:
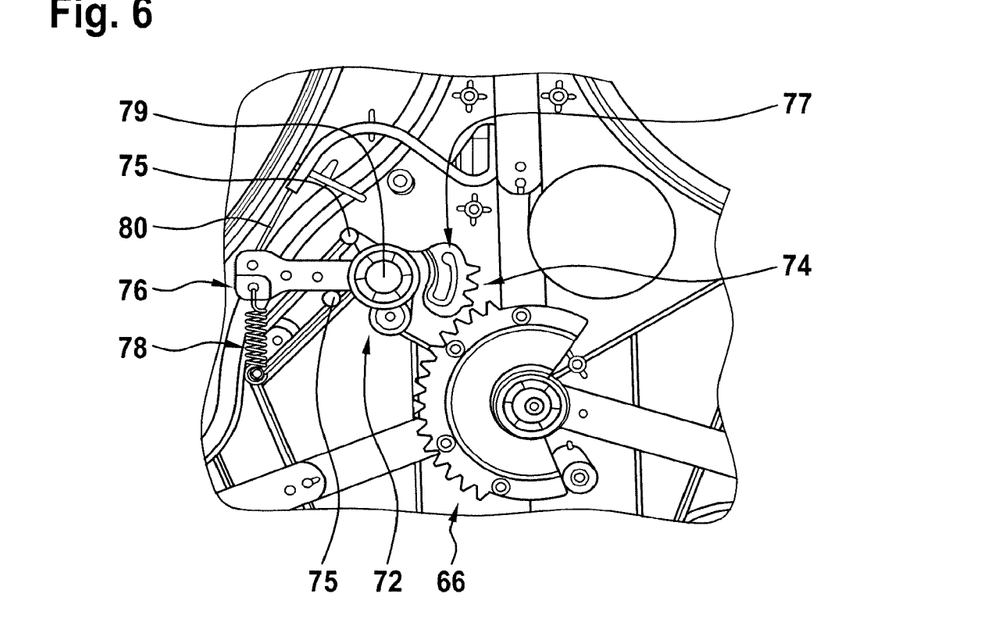
FIG. 6 shows an enlarged view of a locking device according to an embodiment of the invention.

The external teeth 66 may be formed across the entire outer circumference of the toothed element 68 (see FIG. 5) or only across a partial area of the outer circumference of the toothed element 68 (see FIG. 6).

The toothed element 68 with the external teeth 66 is part of a locking device 70 which will be described in more detail in the following with reference to FIGS. 6 and 7.

In addition to the toothed element 68, the locking device 70 comprises a locking mechanism 72 which is pivotably attached to a locking mechanism axis 79 extending orthogonally from the base plate 6 of the wheel clamp 2.

The locking mechanism 72 is pivotable in a plane that is oriented parallel to the base plate 6. The pivoting range of the locking mechanism 72 is limited by two limiting elements (limiting bolts) 75.

At a first end, shown on the right in FIGS. 5 and 6, the locking mechanism 72 comprises a toothed portion 74, the parameters of which correspond to the parameters of the external teeth 66 of the toothed element 68, so that the toothed portion 74 of the locking mechanism 72 can be engaged with the external teeth 66.

At an opposite, second end 76, shown on the left in FIGS. 5 and 6, the locking mechanism 72 is coupled to a first spring element 78. The first spring element 78 is fastened to the base plate 6 via a spring element bolt 79. The first spring element 78 is designed to pull the locking mechanism 72 into the initial position shown in FIGS. 5 and 6.

When the locking mechanism 72 is in the initial position, the toothed portion 74 of the locking mechanism 72 does not engage with the external teeth 66 of the toothed element 68. Consequently, the rotary element 40 can rotate and the outer elements 32a, 33a, 34a coupled to the rotary element 40 are freely movable in the radial direction.

Due to the coupling established by the coupling elements 52, 53, 54 and the rotary element 40, the outer elements 32a, 33a, 34a move synchronously with one another. The distance of the claws 12, 13, 14 from the center, which defines half of the diameter (radius) of the wheel clamp 2, can thus be easily adapted to the diameter D of the wheel 1 to which the wheel clamp 2 is to be attached.

Furthermore, a wire cable (Bowden cable) 80 is mounted on the second end 76 of the locking mechanism 72, which allows pivoting of the locking mechanism 72 about the locking mechanism axis 79, by operating a locking member 82 (see FIGS. 7 and 8), from the initial position shown in FIG. 6 to a locking position in which the toothed portion 74 of the locking mechanism 72 is in engagement with the external teeth 66 of the toothed element 68. This engagement prevents rotation of the rotary element 40. As a result, the outer elements 32a, 33a, 34a of the arms 22, 23, 24, which are coupled to the rotary element 40 by the coupling elements 52, 53, 54, are no longer movable in the radial direction and securely fix the wheel clamp 2 on the wheel 1.

Instead of a wire cable 80, there may also be provided a hydraulic system (not shown in the figures), permitting the locking mechanism 72 to be moved from the initial position into the locking position by actuation of the locking member 82.

Due to a free space 77 formed in the locking mechanism 72 between the toothed portion 74 and the locking mechanism axis 79, the toothed portion 74 is elastic. Due to this elasticity, a tooth of the toothed portion 74, which could lead to blockage in the event of an unfavorable relative positioning of the toothed portion 74 and the external teeth 66, can recede somewhat and slip into an adjacent tooth gap of the external teeth 66. An undesirable blockage between the toothed portion 74 of the locking mechanism 72 and the external teeth 66 of the toothed element 68 can thus be prevented. Blockage between the toothed portion 74 of the locking mechanism 72 and the external teeth 66 could result in the locking mechanism 72 not being able to be pivoted from the initial position into the locking position.

The locking mechanism 72 and the external teeth 66 of the toothed element 68 may be made of metal and/or plastic.

Figure 7:
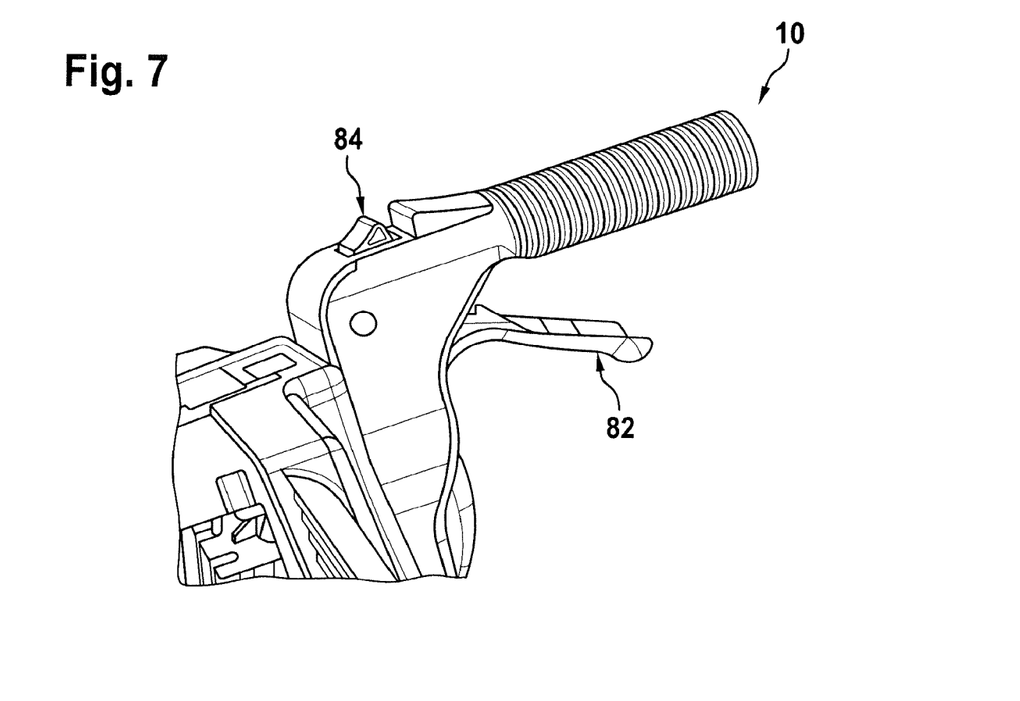
FIG. 7 shows a first embodiment of a locking member according to an embodiment of the invention.
Figure 8:
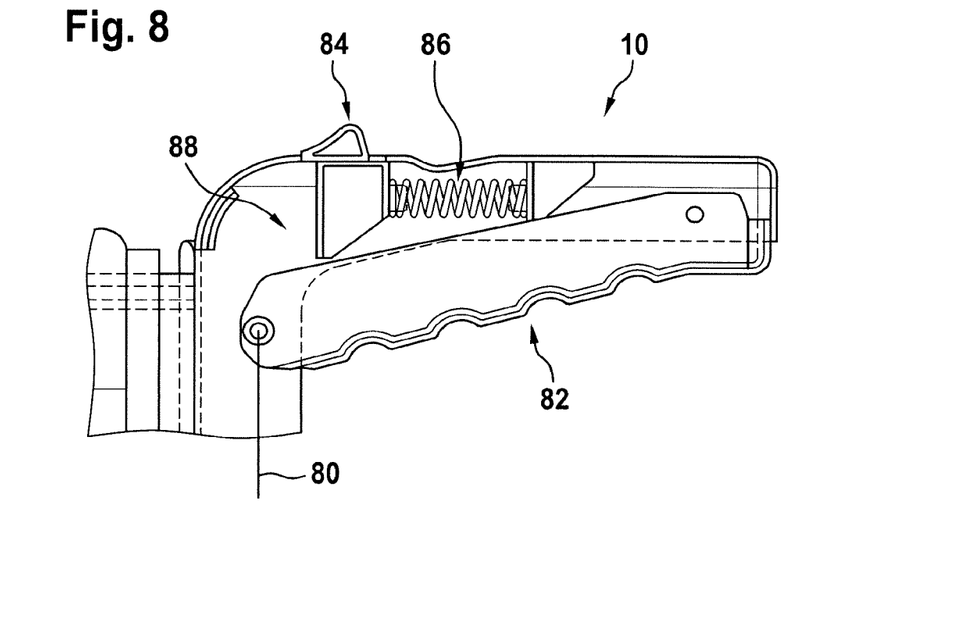
FIG. 8 shows a second embodiment of a locking member according to an embodiment of the invention.

FIGS. 7 and 8 show two different possible exemplary embodiments of a locking member 82 which is designed to move the locking mechanism 72 on/in a carrying handle 10 of the wheel adapter 2.

In the carrying handle 10 shown in FIG. 8, there is provided a second spring element 86 which is designed to push the locking member 82 into an initial position in which the locking mechanism 72 coupled to the locking member 82 via the wire cable 80 is in its initial position. When the locking mechanism 72 is arranged in its initial position, the toothed portion 74 of the locking mechanism 72 is not in engagement with the external teeth 66 of the toothed element 68.

By actuating (pulling) the locking member 82, the locking mechanism 72 is moved from the initial position into the engaged position via the wire cable 80. In doing so, the toothed portion 74 thereof is engaged with the external teeth 66 of the toothed element 68, whereby additional mechanical tension is applied to the movable outer elements 32a, 33a, 34a and further rotation of the rotary element 40 is prevented in order to securely fasten the wheel clamp 2 to the wheel 1.

By means of a locking member fixing mechanism 88 formed in the carrying handle 10, the locking member 82 can be fixed in the actuated position in which the locking mechanism 72 is in its engaged position. When the locking member 82 is fixed in the actuated position, rotation of the rotary element 40 is prevented by the engagement of the toothed portion 74 of the locking mechanism 72 with the external teeth 66 of the toothed element 68, i.e. the rotary element 40 remains blocked even when the operator's hand is removed from the locking member 82.

By operating an unlocking member 84 formed in the carrying handle 10, the fixation of the locking member 82 can be released in order to thereby release the movable outer elements 32a, 33a, 34a and relax the arms 22, 23, 24, so that the wheel clamp 2 can easily be removed from the wheel 1.

The invention claimed is:

1. A wheel clamp for attachment to a wheel, in particular to a wheel of a motor vehicle, the wheel clamp comprising:
   at least two arms which extend outward in a radial direction; each of the arms having at least one movable element which is movable in the radial direction and is provided for abutment on the wheel;
   a movable locking mechanism which is movable into a locking position in which it clamps the movable elements against the wheel and fixes the same in a tensioned position;
   a locking member which is designed such that the locking mechanism is pivotable into the locking position by operation of the locking member; and
   a toothed element which is mechanically coupled with the movable elements, wherein the locking mechanism engages with the toothed element when the locking mechanism in in the locking position.

2. The wheel clamp according to claim 1, further comprising
   an unlocking member which is designed such that a fixation of the movable elements can be released by operation of the unlocking member.

3. The wheel clamp according to claim 2,
   comprising a carrying handle for carrying the wheel clamp, wherein at least one of the locking member and the unlocking member is formed in or on the carrying handle.

4. The wheel clamp according to claim 3,
   wherein the carrying handle, the locking member and/or the unlocking member are designed such that the locking member and/or the unlocking member are easy to operate for both left-handed and right-handed operators.

5. The wheel clamp according to claim 1,
   wherein at least one of the toothed member and the locking mechanism has an arcuate or circular shape.

6. The wheel clamp according to claim 5,
   wherein the locking mechanism is at least partially elastic.

7. The wheel clamp according to claim 6,
   wherein the locking mechanism is coupled to the locking member by a wire cable or hydraulically.

8. The wheel clamp according to claim 7,
   comprising a locking member fixing mechanism which is designed to fix the locking member in a locked position.

9. The wheel clamp according to claim 8,
   comprising a spring element which is designed to move the locking member into an initial position in which the movable elements are not fixed.

10. The wheel clamp according to claim 1,
    comprising a carrying handle for carrying the wheel clamp, wherein the locking member is formed in or on the carrying handle.

11. The wheel clamp according to claim 10,
    wherein the carrying handle and the locking member are designed such that the locking member and/or the unlocking member are easy to operate for both left-handed and right-handed operators.

12. The wheel clamp according to claim 1,
    wherein the locking mechanism is at least partially elastic.

13. The wheel clamp according to claim 1,
    wherein the locking mechanism is coupled to the locking member by a wire cable or hydraulically.

14. The wheel clamp according to claim 1,
    comprising a locking member fixing mechanism which is designed to fix the locking member in a locked position.

15. The wheel clamp according to claim 1,
comprising a spring element which is designed to move the locking member into an initial position in which the movable elements are not fixed.

16. The wheel clamp according to claim 5,
wherein the locking mechanism is coupled to the locking member by a wire cable or hydraulically.

\* \* \* \* \*